(12) United States Patent
Aiba

(10) Patent No.: US 11,044,349 B2
(45) Date of Patent: Jun. 22, 2021

(54) INFORMATION PROCESSING APPARATUS, AND NON-TRANSITORY COMPUTER READABLE RECORDING MEDIUM THAT STORES PACKET PATTERN CREATION PROGRAM

(71) Applicant: KYOCERA DOCUMENT SOLUTIONS INC., Osaka (JP)

(72) Inventor: Masaaki Aiba, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/843,598

(22) Filed: Apr. 8, 2020

(65) Prior Publication Data

US 2020/0329126 A1  Oct. 15, 2020

(30) Foreign Application Priority Data

Apr. 11, 2019 (JP) .............................. JP2019-075400

(51) Int. Cl.
| | | |
|---|---|---|
| H04L 29/06 | (2006.01) | |
| H04W 76/27 | (2018.01) | |
| H04L 12/801 | (2013.01) | |

(52) U.S. Cl.
CPC .......... *H04L 69/161* (2013.01); *H04L 47/193* (2013.01); *H04L 69/163* (2013.01);
(Continued)

(58) Field of Classification Search
CPC . H04L 47/193; H04L 47/196; H04L 61/6063; H04L 69/161; H04L 69/163; H04L 69/165; H04L 69/22; H04W 40/005
(Continued)

(56) References Cited

U.S. PATENT DOCUMENTS

2005/0059386 A1* 3/2005 Li ..................... H04W 52/0229
455/420
2008/0162682 A1* 7/2008 Ramachandran ..... G06F 1/3203
709/223

(Continued)

FOREIGN PATENT DOCUMENTS

JP         2006279821 A      10/2006

*Primary Examiner* — Robert J Lopata
(74) *Attorney, Agent, or Firm* — Li & Cai Intellectual Property (USA) Office

(57) ABSTRACT

An information processing apparatus includes: a sub controller; a main controller; and a communication interface, the main controller being configured to detect a trigger to start the sleep mode, then create port-dependent TCP packet patterns and port-dependent UDP packet patterns, the port-dependent TCP packet patterns being packet patterns specifying all in-use TCP ports, the port-dependent UDP packet patterns being packet patterns specifying all in-use UDP ports, determine that a total number of the port-dependent UDP packet patterns and the port-dependent TCP packet patterns exceeds a maximum value, then delete all the port-dependent TCP packet patterns, create port-independent TCP packet patterns for different TCP protocols, respectively, the port-independent TCP packet pattern being one packet pattern specifying no TCP port, and supply the port-dependent UDP packet patterns and the port-independent TCP packet patterns to the sub controller, and start the sleep mode.

5 Claims, 10 Drawing Sheets

(52) U.S. Cl.
CPC ............ *H04L 69/165* (2013.01); *H04L 69/22* (2013.01); *H04W 76/27* (2018.02)

(58) Field of Classification Search
USPC .......................................................... 370/392
See application file for complete search history.

(56) References Cited

U.S. PATENT DOCUMENTS

| | | | | |
|---|---|---|---|---|
| 2009/0161662 | A1* | 6/2009 | Wu | G06F 1/3203 370/352 |
| 2009/0164816 | A1* | 6/2009 | Yasuda | H04L 12/10 713/320 |
| 2009/0248890 | A1* | 10/2009 | Shouno | H04N 1/33323 709/232 |
| 2011/0078464 | A1* | 3/2011 | Yokomizo | G06F 1/3203 713/300 |
| 2011/0302278 | A1* | 12/2011 | Shim | H04L 12/12 709/219 |
| 2012/0110357 | A1* | 5/2012 | Shouno | G06F 1/3284 713/320 |
| 2012/0137150 | A1* | 5/2012 | Yokokura | G06F 3/1221 713/320 |
| 2013/0308642 | A1* | 11/2013 | Kimura | G06F 1/3278 370/392 |
| 2014/0126391 | A1* | 5/2014 | Liu | H04W 52/0206 370/252 |
| 2014/0204950 | A1* | 7/2014 | Willars | H04L 61/35 370/392 |
| 2014/0223564 | A1* | 8/2014 | Joo | H04L 63/1416 726/23 |
| 2016/0134588 | A1* | 5/2016 | Falkowitz | H04L 63/1441 726/11 |
| 2016/0306413 | A1* | 10/2016 | Yamamizu | H04N 1/00885 |

* cited by examiner

INFORMATION PROCESSING APPARATUS, AND NON-TRANSITORY COMPUTER READABLE RECORDING MEDIUM THAT STORES PACKET PATTERN CREATION PROGRAM

CROSS-REFERENCE TO RELATED PATENT APPLICATION

This application claims the benefit of Japanese Priority Patent Application JP 2019-075400 filed Apr. 11, 2019, the entire contents of which are incorporated herein by reference.

FIELD OF THE DISCLOSURE

The present disclosure relates to an information processing apparatus configured to selectively execute a normal mode and a sleep mode. The present disclosure further relates to a non-transitory computer readable recording medium that stores a packet pattern creation program.

BACKGROUND OF THE DISCLOSURE

There is known an information processing apparatus configured to selectively execute a normal mode and a sleep mode.

SUMMARY OF THE DISCLOSURE

From a viewpoint of energy saving, it is desirable for an information processing apparatus to appropriately start a sleep mode and appropriately return from the sleep mode.

According to an embodiment of the present disclosure, there is provided an information processing apparatus, including:
 a sub controller;
 a main controller configured to notify the sub controller that the main controller starts a sleep mode and returns from the sleep mode; and
 a communication interface configured to communicate with an external device connected to a network,
  the main controller being configured to
   detect a trigger to start the sleep mode, then
   create port-dependent TCP packet patterns and port-dependent UDP packet patterns, the port-dependent TCP packet patterns being packet patterns specifying all in-use TCP ports, the port-dependent UDP packet patterns being packet patterns specifying all in-use UDP ports,
   determine that a total number of the port-dependent UDP packet patterns and the port-dependent TCP packet patterns exceeds a maximum value, then
   delete all the port-dependent TCP packet patterns,
   create port-independent TCP packet patterns for different TCP protocols, respectively, the port-independent TCP packet pattern being one packet pattern specifying no TCP port, and
   supply the port-dependent UDP packet patterns and the port-independent TCP packet patterns to the sub controller, and start the sleep mode,
  the sub controller being configured to, in the sleep mode,
   determine whether or not a packet pattern of a packet received from the external device via the communication interface matches with one of the port-dependent UDP packet patterns and the port-independent TCP packet patterns,
   where the sub controller determines that the packet pattern matches with no packet pattern, discard the received packet, and
   where the sub controller determines that the packet pattern matches with one packet pattern, request the main controller to return from the sleep mode, and transfer the packet to the main controller.

According to an embodiment of the present disclosure, there is provided a non-transitory computer readable recording medium that stores a packet pattern creation program executable by an information processing apparatus including
 a sub controller,
 a main controller configured to notify the sub controller that the main controller starts a sleep mode and returns from the sleep mode, and
 a communication interface configured to communicate with an external device connected to a network,
 the packet pattern creation program causing the main controller of the information processing apparatus to
  detect a trigger to start the sleep mode, then
  create port-dependent TCP packet patterns and port-dependent UDP packet patterns, the port-dependent TCP packet patterns being packet patterns specifying all in-use TCP ports, the port-dependent UDP packet patterns being packet patterns specifying all in-use UDP ports,
  determine that a total number of the port-dependent UDP packet patterns and the port-dependent TCP packet patterns exceeds a maximum value, then
  delete all the port-dependent TCP packet patterns,
  create port-independent TCP packet patterns for different TCP protocols, respectively, the port-independent TCP packet pattern being one packet pattern specifying no TCP port, and
  supply the port-dependent UDP packet patterns and the port-independent TCP packet patterns to the sub controller, and start the sleep mode.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Configuration of Information Processing Apparatus

Figure 1:
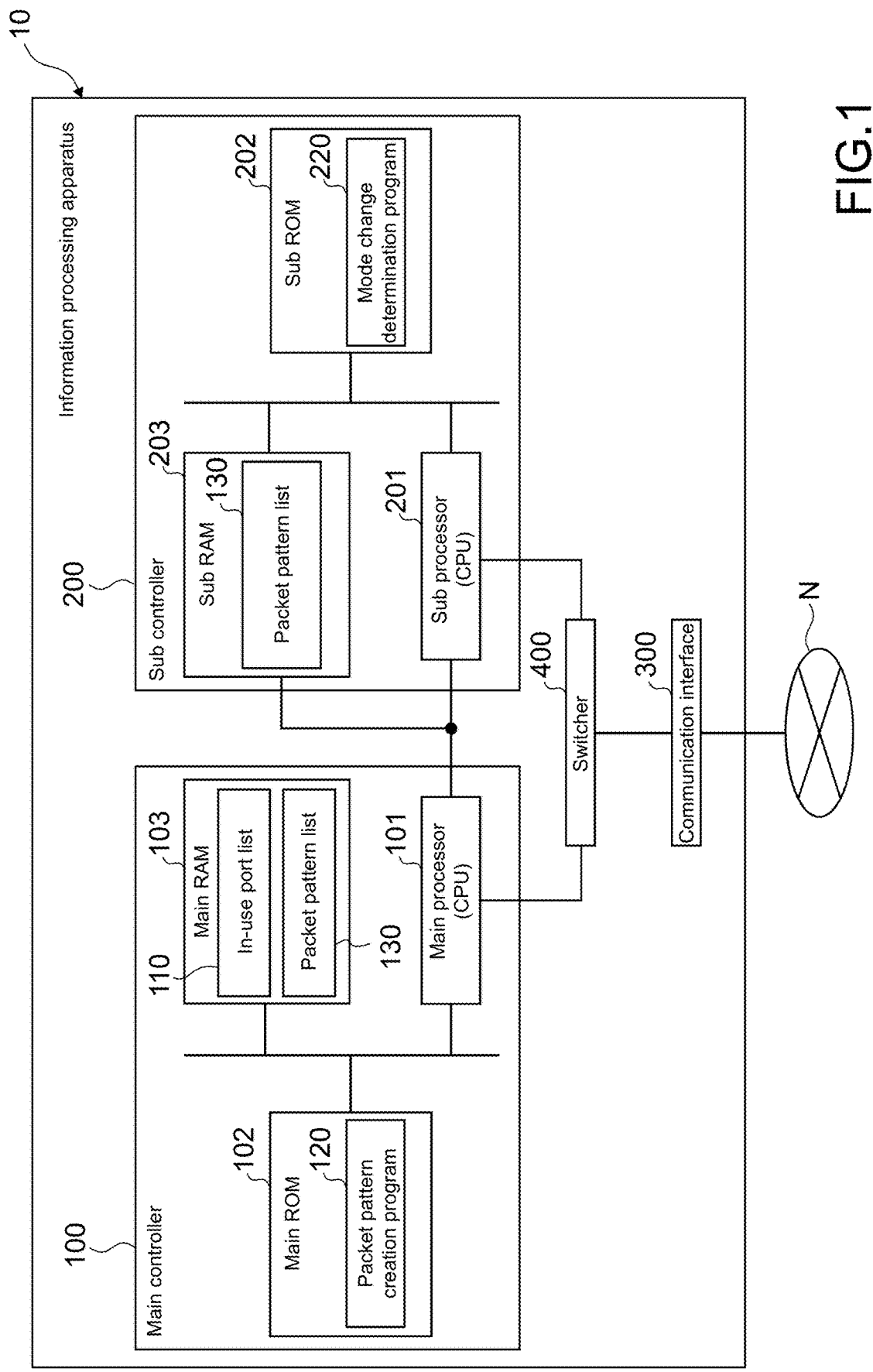
FIG. 1 shows a configuration of an information processing apparatus according to an embodiment of the present disclosure.

FIG. 1 shows a configuration of an information processing apparatus according to an embodiment of the present disclosure.

The information processing apparatus 10 is an image forming apparatus (MFP, etc.), a personal computer (including various types such as desktop, laptop, tablet, smartphone, or wearable), or the like. The information processing apparatus 10 sends and receives packets to and from an external device (not shown) via the network N. In the present embodiment, the information processing apparatus 10 uses the protocols TCP/IPv4, TCP/IPv6, UDP/IPv6, and UDP/IPv6 for network communication.

The information processing apparatus 10 includes the main controller 100, the sub controller 200, the communication interface 300, and the switcher 400, which are connected to each other via a bus.

The main controller 100 executes various processing in the normal mode. The main controller 100 includes the main processor (CPU, Central Processing Unit) 101, the main ROM (Read Only Memory) 102, the main RAM (Random Access Memory) 103 (main memory), a dedicated hardware circuit, and the like. Where the information processing apparatus 10 is an image forming apparatus, an image scanner, a printer, an image memory, a display device, an operation device, a nonvolatile storage device (HDD (Hard Disk Drive), etc.) (not shown and not described) are connected to the main controller 100. The main controller 100 controls such hardware (not shown), the communication interface 300, and the switcher 400.

The main processor 101 loads various programs (including the packet pattern creation program 120) stored in the main ROM 102 in the main RAM 103, and executes the programs. The main processor 101 detects a certain trigger (for example, no user's operation is input for certain time period, or no information is received via network for certain time period) in the normal mode, and then starts the sleep mode. The normal mode means a status where the main controller 100 is power on (power is not shown), and the sleep mode means a status where the main controller 100 is power off. The main processor 101 notifies the sub processor 201 of the sub controller 200 and the switcher 400 that the main controller 100 in the normal mode starts the sleep mode and returns to the normal mode from the sleep mode.

The main ROM 102 stores the packet pattern creation program 120.

The sub controller 200, in the sleep mode, receives a packet from an external device via the network N, and then determines whether or not the main controller 100 will return from the sleep mode. The sub controller 200 includes the sub processor (CPU) 201, the sub ROM 202, the sub RAM 203 (sub memory), a dedicated hardware circuit, and the like. The spec of the devices of the sub controller 200 are lower than the spec of the devices of the main controller 100. The operational power consumed by the devices of the sub controller 200 is lower than the operational power consumed by the devices of the main controller 100.

The sub RAM 203 (sub memory) stores the packet pattern list 130. For example, at the timing at which the main processor 101 in the normal mode starts the sleep mode, the main processor 101 creates the packet pattern list 130 of the in-use ports, and writes the packet pattern list 130 in the sub RAM 203.

The sub processor 201 receives, from the main processor 101, notification that the main processor 101 in the normal mode starts the sleep mode. In the sleep mode, the sub processor 201 loads the mode change determination program 220 stored in the sub ROM 202 in the sub RAM 203, and executes the mode change determination program 220. Where the packet pattern of the received packet matches with the packet pattern list 130, the sub processor 201 requests the main processor 101 to return to the normal mode from the sleep mode, and transfers the packet to the main processor 101. Meanwhile, where the packet pattern of the received packet does not match with the packet pattern list 130, the sub processor 201 discards the received packet.

The sub ROM 202 stores the mode change determination program 220.

2. Operational Flow of Main Controller

Figure 2:
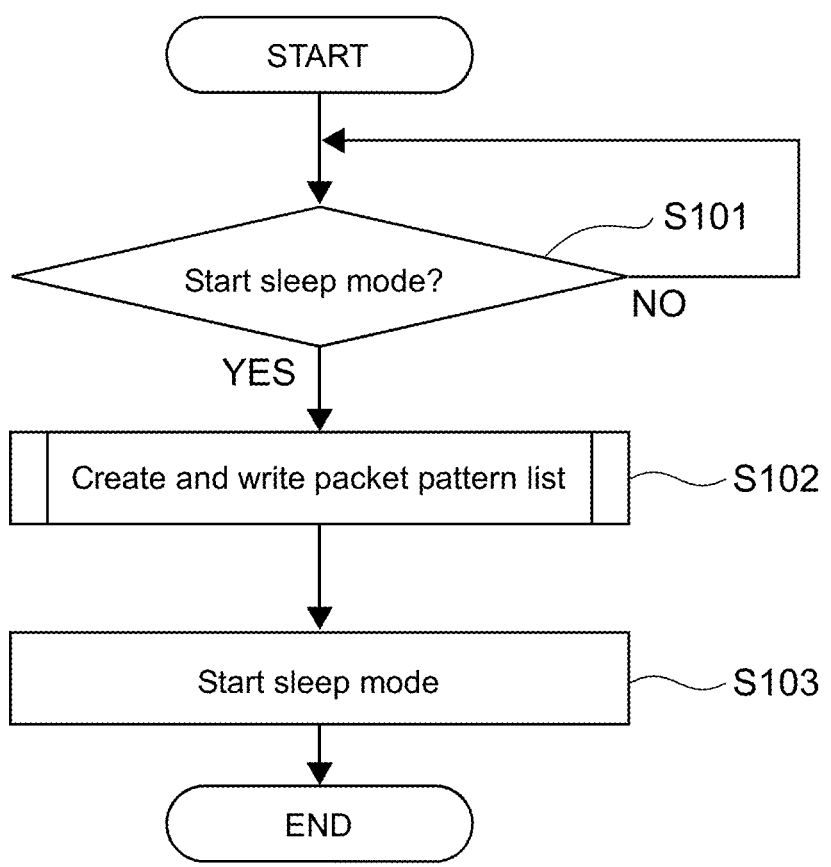
FIG. 2 shows a first operational flow of the main controller.

FIG. 2 shows a first operational flow of the main controller.

The main processor 101 of the main controller 100 detects a trigger (for example, no user's operation is input for certain time period, or no information is received via network for certain time period) to start the sleep mode (Step S101, YES).

Then, the main processor 101 loads the packet pattern creation program 120 stored in the main ROM 102 in the main RAM 103, and executes the packet pattern creation program 120 to thereby create the packet pattern list 130 (described below in detail). The main processor 101 supplies the created packet pattern list 130 to the sub controller 200. Specifically, the main processor 101 writes the packet pattern list 130 in the sub RAM 203 (Step S102).

The main processor 101 in the normal mode notifies the sub processor 201 of the sub controller 200 that the main processor 101 starts the sleep mode, and starts the sleep mode (i.e., powers off the main controller 100) (Step S103).

3. Method of Creating Packet Pattern

Figure 3:
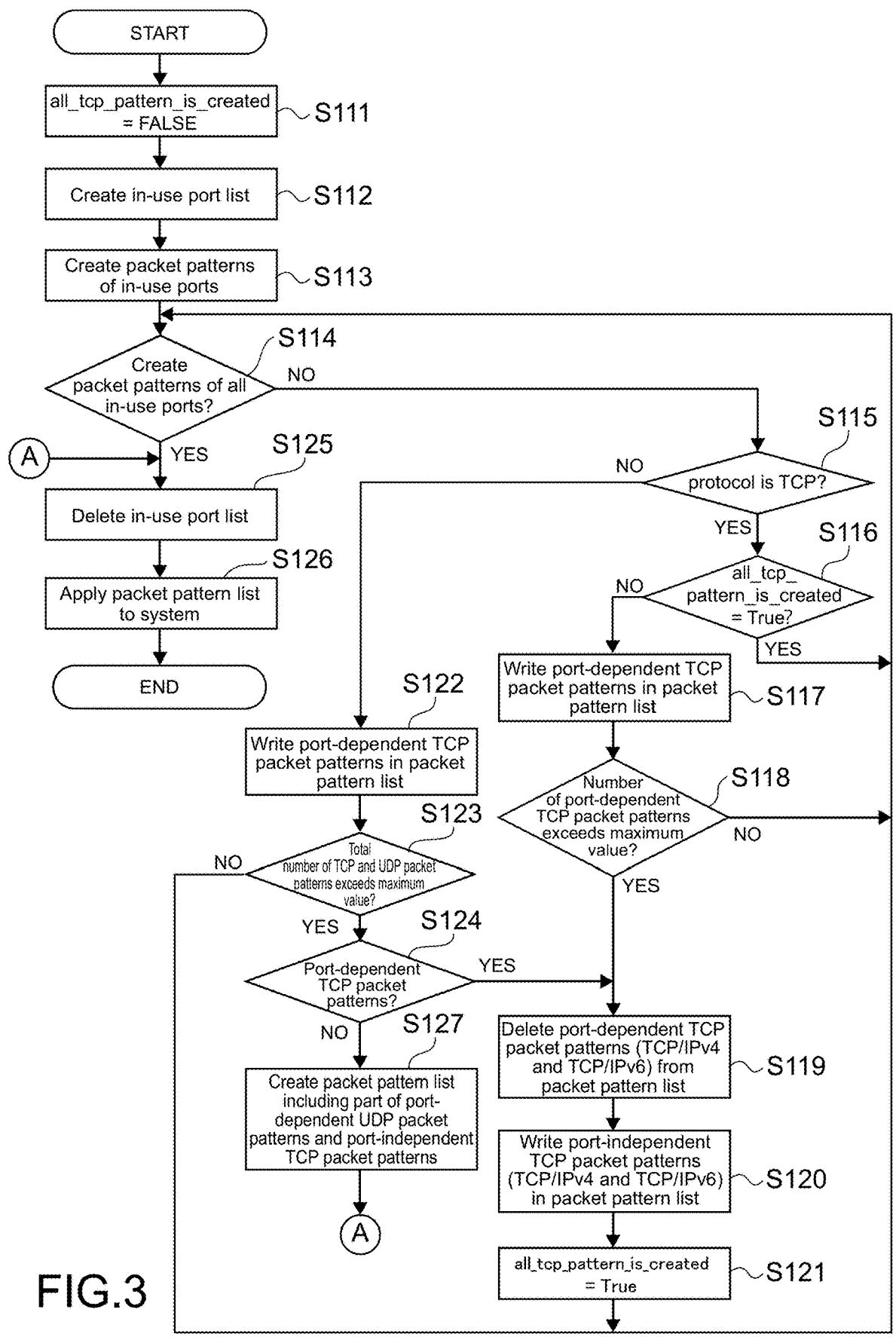
FIG. 3 shows a second operational flow of the main controller.

FIG. 3 shows a second operational flow of the main controller. A method of creating the packet pattern list 130 (Step S102) by the main processor 101 of the main controller 100 will be described.

Firstly, the main processor 101 sets the flag "all_tcp_pattern_is_created=FALSE" (Step S111). This flag means that the main processor 101 creates no packet patterns (port-dependent TCP packet patterns) specifying in-use TCP ports at all.

The main processor 101 creates a list (the in-use port list 110) of all the in-use ports (including TCP/IPv4 ports, TCP/IPv6 ports, UDP/IPv4 ports, and UDP/IPv6 ports). The main processor 101 writes the created in-use port list 110 in the main RAM 103 (Step S112).

The main processor 101 starts creating packet patterns specifying all the in-use ports included in the in-use port list 110, respectively (Step S113).

The main processor 101 determines whether or not the in-use port list 110 includes TCP ports (TCP/IPv4 ports and TCP/IPv6 ports) (Step S115).

The main processor 101 determines that the in-use port list 110 includes TCP ports (TCP/IPv4 ports and TCP/IPv6 ports) (Step S115, YES).

The main processor 101 creates, one by one, packet patterns (port-dependent TCP packet patterns) specifying the in-use TCP ports included in the in-use port list 110 (Step S116, NO). The main processor 101 creates a list of the created packet patterns to thereby create the packet pattern list 130. The main processor 101 writes the created packet pattern list 130 in the main RAM 103 (Step S117). A specific example of the port-dependent TCP packet pattern will be described.

Figure 4:
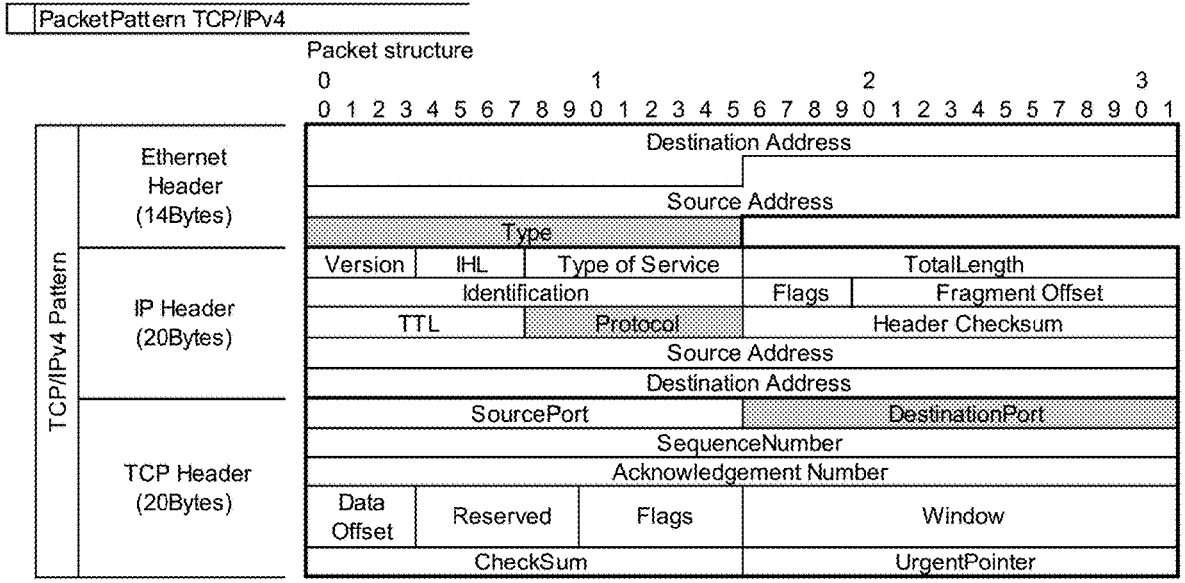
FIG. 4 schematically shows a port-dependent TCP packet pattern of a TCP/IPv4 port.

FIG. 4 schematically shows a port-dependent TCP packet pattern of a TCP/IPv4 port.

FIG. 4 shows a packet structure of a port-dependent TCP packet pattern of a TCP/IPv4 port. For the "type" field, the mask (location for matching) "0xFFFF" has the value (value for matching) "0x0800". For the "protocol" field, the mask (location for matching) "0xFF" has the value (value for matching) "0x06". For the "destination port" field, the mask (location for matching) "0xFFFF" has the value (value for matching) "in-use port number" (different value depending on port-dependent TCP packet pattern).

Figure 5:
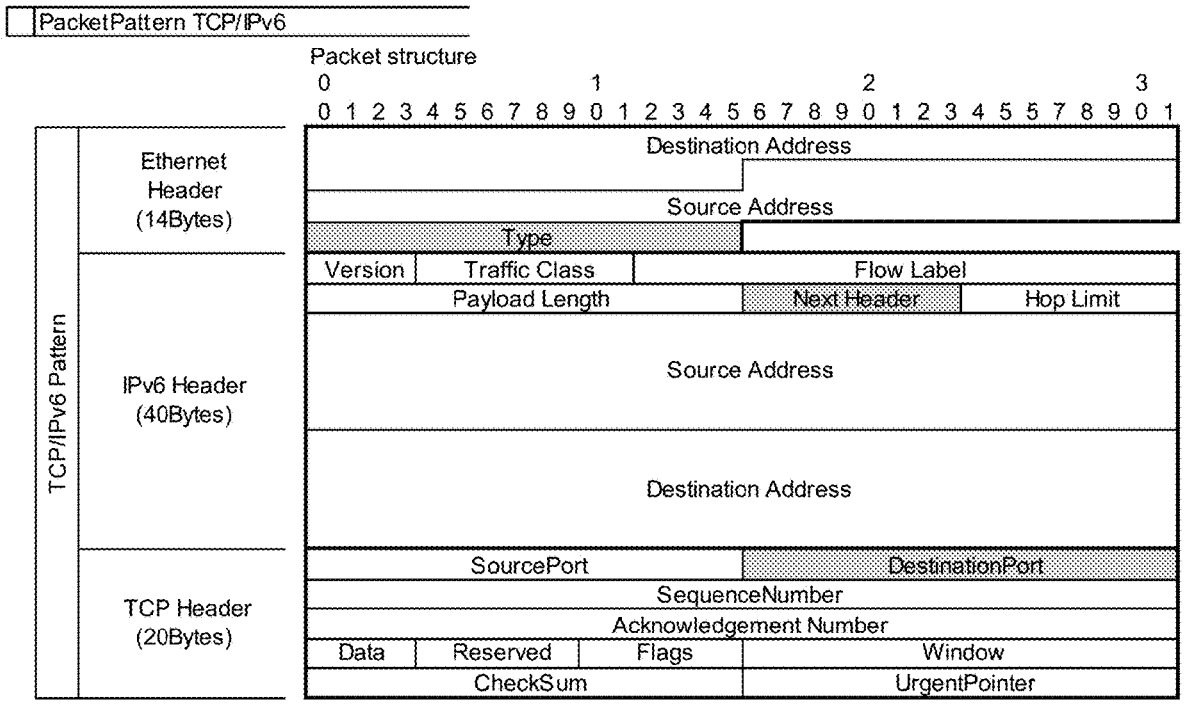
FIG. 5 schematically shows a port-dependent TCP packet pattern of a TCP/IPv6 port.

FIG. 5 schematically shows a port-dependent TCP packet pattern of a TCP/IPv6 port.

FIG. 5 shows a packet structure of a port-dependent TCP packet pattern of a TCP/IPv6 port. For the "type" field, the mask (location for matching) "0xFFFF" has the value (value for matching) "0x86DD". For the "next header" field, the mask (location for matching) "0xFF" has the value (value for matching) "0x06". For the "destination port" field, the mask (location for matching) "0xFFFF" has the value (value for matching) "in-use port number" (different value depending on port-dependent TCP packet pattern).

The main processor 101 determines whether or not the number of port-dependent TCP packet patterns included in the packet pattern list 130 exceeds a maximum value (Step S118). The "maximum value" is determined depending on, for example, the spec and the like of the sub RAM 203 (the packet pattern list 130 is to be written in the sub RAM 203 later). For example, maximum value=64.

The main processor 101 determines that the number of port-dependent TCP packet patterns included in the packet pattern list 130 written in the main RAM 103 fails to exceed the maximum value (Step S118, NO). Then the main processor 101 creates port-dependent TCP packet patterns specifying the in-use TCP ports included in the in-use port list 110, and keeps on adding the port-dependent TCP packet patterns into the packet pattern list 130 (Step S116, NO).

The main processor 101 creates the port-dependent TCP packet patterns specifying all the in-use TCP ports included in the in-use port list 110. Then, the main processor 101 sets the flag "all_tcp_pattern_is_created=True" (Step S116, YES).

Meanwhile, the main processor 101 determines that the number of port-dependent TCP packet patterns included in the packet pattern list 130 written in the main RAM 103 exceeds the maximum value (Step S118, YES). It means that, where port-dependent UDP packet patterns (described later) and port-dependent TCP packet patterns specifying all the in-use ports included in the in-use port list 110 are to be created, the total number of the packet patterns exceeds the maximum value.

In this case, the main processor 101 deletes all the created port-dependent TCP packet patterns (TCP/IPv4 and TCP/IPv6) from the packet pattern list 130 written in the main RAM 103 (Step S119). As a result, the number of port-dependent TCP packet patterns included in the packet pattern list 130 is zero.

The main processor 101 creates one packet pattern (port-independent TCP packet pattern) specifying no TCP port for each of the different TCP protocols (TCP/IPv4 and TCP/IPv6). Specifically, the main processor 101 creates two, in total, port-independent TCP packet patterns including one port-independent TCP packet pattern of TCP/IPv4 protocol and one port-independent TCP packet pattern of TCP/IPv6 protocol. The main processor 101 writes the two created port-independent TCP packet patterns in the packet pattern list 130 (Step S120). As a result, the main processor 101 completes creation of TCP packet patterns, and sets the flag "all_tcp_pattern_is_created=True" (Step S121). A specific example of a port-independent TCP packet pattern will be described.

Figure 6:
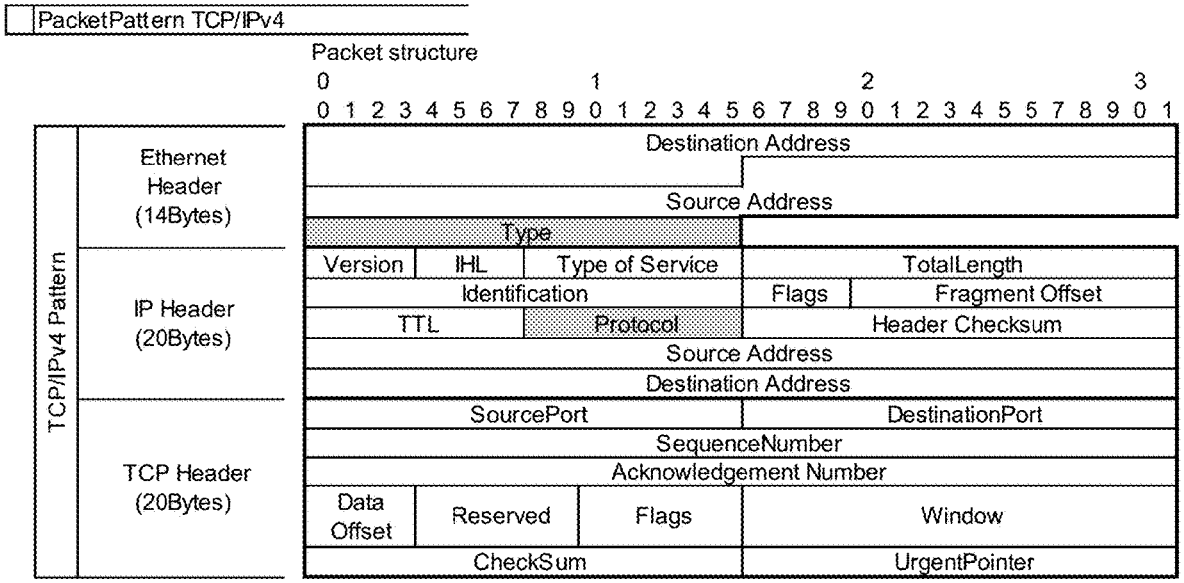
FIG. 6 schematically shows a port-independent TCP packet pattern of a TCP/IPv4 port.

FIG. 6 schematically shows a port-independent TCP packet pattern of a TCP/IPv4 port.

The difference from a port-dependent TCP packet pattern (FIG. 4) of a TCP/IPv4 port is as follows. A port-independent TCP packet pattern (FIG. 6) includes no value for the "destination port" field (not location for matching).

Figure 7:
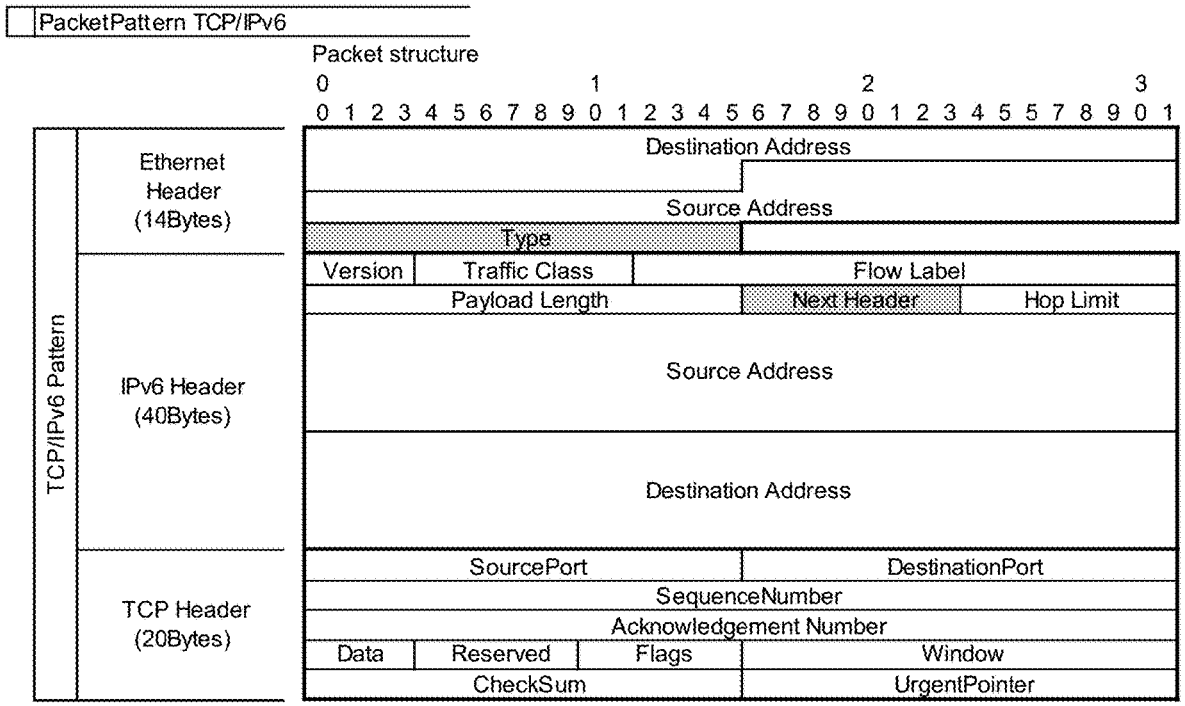
FIG. 7 schematically shows a port-independent TCP packet pattern of a TCP/IPv6 port.

FIG. 7 schematically shows a port-independent TCP packet pattern of a TCP/IPv6 port.

The difference from a port-dependent TCP packet pattern (FIG. 5) of a TCP/IPv6 port is as follows. A port-independent TCP packet pattern (FIG. 7) includes no value for the "destination port" field (not location for matching).

As described above, in principle, the main processor 101 creates the port-dependent TCP packet patterns specifying all the in-use TCP ports included in the in-use port list 110, and writes the port-dependent TCP packet patterns in the packet pattern list 130 (Step S116, YES). As an exception, where the number of the port-dependent TCP packet patterns exceeds the maximum value (Step S118, YES), the main processor 101 creates the two port-independent TCP packet patterns, and writes the two port-independent TCP packet patterns in the packet pattern list 130 (Step S121).

Next, the main processor 101 starts creating UDP packet patterns (Step S115, NO).

The main processor 101 creates, one by one, packet patterns (port-dependent UDP packet patterns) specifying the in-use UDP ports (UDP/IPv4 ports and UDP/IPv6 ports) included in the in-use port list 110, and adds the packet patterns in the packet pattern list 130 (Step S122). A specific example of a port-dependent UDP packet pattern will be described.

Figure 8:
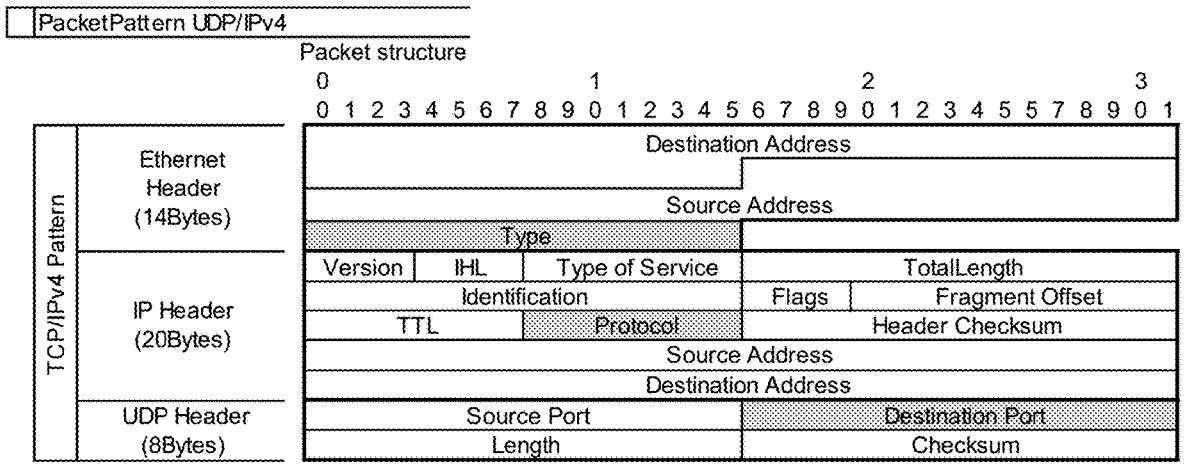
FIG. 8 schematically shows a port-dependent UDP packet pattern of a UDP/IPv4 port.

FIG. 8 schematically shows a port-dependent UDP packet pattern of a UDP/IPv4 port.

FIG. 8 shows a packet structure of a port-dependent UDP packet pattern of a UDP/IPv4 port. For the "type" field, the mask (location for matching) "0xFFFF" has the value (value for matching) "0x0800". For the "protocol" field, the mask (location for matching) "0xFF" has the value (value for matching) "0x11". For the "destination port" field, the mask (location for matching) "0xFFFF" has the value (value for matching) "in-use port number" (different value depending on port-dependent UDP packet pattern).

Figure 9:
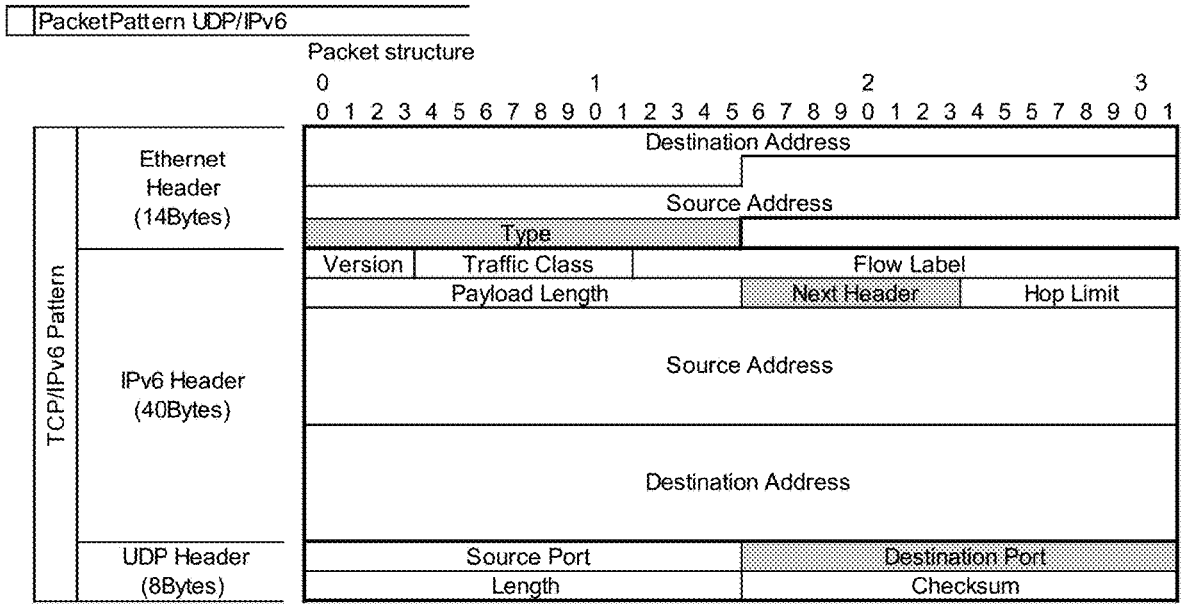
FIG. 9 schematically shows a port-dependent UDP packet pattern of a UDP/IPv6 port.

FIG. 9 schematically shows a port-dependent UDP packet pattern of a UDP/IPv6 port.

FIG. 9 shows a packet structure of a port-dependent UDP packet pattern of a UDP/IPv6 port. For the "type" field, the mask (location for matching) "0xFFFF" has the value (value for matching) "0x86DD". For the "next header" field, the mask (location for matching) "0xFF" has the value (value for matching) "0x11". For the "destination port" field, the mask (location for matching) "0xFFFF" has the value (value for matching) "in-use port number" (different value depending on port-dependent UDP packet pattern).

The main processor 101 determines whether or not the total number of the TCP packet patterns and the port-dependent UDP packet patterns included in the packet pattern list 130 exceeds the maximum value (for example, maximum value=64) (Step S123). Specifically, the main processor 101 determines whether or not the total number of the port-dependent TCP packet patterns (Step S116, YES) and the port-dependent UDP packet patterns included in the packet pattern list 130 exceeds the maximum value. Alternatively, the main processor 101 determines whether or not the total number of the port-independent TCP packet patterns (Step S121) and the port-dependent UDP packet patterns included in the packet pattern list 130 exceeds the maximum value.

The main processor 101 determines that the total number of the TCP packet patterns (port-dependent TCP packet patterns or port-independent TCP packet patterns) and the port-dependent UDP packet patterns included in the packet pattern list 130 fails to exceed the maximum value (Step S123, NO). Then, the main processor 101 creates packet patterns (port-dependent UDP packet patterns) specifying in-use UDP ports included in the in-use port list 110. The main processor 101 keeps on adding the packet patterns (port-dependent UDP packet patterns) into the packet pattern list 130 (Step S115, NO).

At last, the main processor 101 creates the port-dependent UDP packet patterns specifying all the in-use UDP ports included in the in-use port list 110 (Step S114, YES).

Then, the main processor 101 deletes the in-use port list 110 from the main RAM 103 (Step S125). The main processor 101 determines the packet pattern list 130 written in the main RAM 103 as the packet pattern list 130 to be applied to the system (Step S126).

Meanwhile, the main processor 101 determines that the total number of the TCP packet patterns (port-dependent TCP packet patterns or port-independent TCP packet patterns) and the port-dependent UDP packet patterns included in the packet pattern list 130 exceeds the maximum value (Step S123, YES).

Then, the main processor 101 determines whether the TCP packet patterns included in the packet pattern list 130 written in the main RAM 103 are multiple port-dependent TCP packet patterns or two port-independent TCP packet patterns (Step S124).

The main processor 101 determines that the TCP packet patterns included in the packet pattern list 130 written in the main RAM 103 are multiple (Step S116, YES) port-dependent TCP packet patterns (Step S124, YES).

Then, the main processor 101 deletes all the created port-dependent TCP packet patterns from the packet pattern list 130 written in the main RAM 103 (Step S119). The main processor 101 creates two port-independent TCP packet patterns, and writes the two created port-independent TCP packet patterns in the packet pattern list 130 (Step S120), and sets the flag "all_tcp_pattern_is_created=True" (Step S121).

In this case, the number of packet patterns included in the packet pattern list 130 is reduced. Therefore the main processor 101 is possible to create port-dependent UDP packet patterns specifying in-use UDP ports included in the in-use port list 110, and keep on adding the port-dependent UDP packet patterns into the packet pattern list 130 (Step S123, NO).

As a result, the main processor 101 creates the port-dependent UDP packet patterns specifying all the in-use UDP ports included in the in-use port list 110 (Step S114, YES). In this case, the total number of the port-independent TCP packet patterns and the port-dependent UDP packet patterns included in the packet pattern list 130 fails to exceed the maximum value (Step S123, NO).

The main processor 101 deletes the in-use port list 110 from the main RAM 103 (Step S125). The main processor 101 determines the packet pattern list 130 written in the main RAM 103 as the packet pattern list 130 to be applied to the system (Step S126).

Meanwhile, the main processor 101 determines that the TCP packet patterns included in the packet pattern list 130 (total number exceeds maximum value) are the two (Step S121) port-independent TCP packet patterns (Step S124, NO).

In this case, the main processor 101 creates, at last, the packet pattern list 130 including part of the port-dependent UDP packet patterns and all the (two) port-independent TCP packet patterns (Step S127). In this case, the total number of the part of port-dependent UDP packet patterns and all the (two) port-independent TCP packet patterns included in the packet pattern list 130 is the maximum value.

The main processor 101 deletes the in-use port list 110 from the main RAM 103 (Step S125). The main processor 101 determines the packet pattern list 130 written in the main RAM 103 as the packet pattern list 130 to be applied to the system (Step S126).

4. Operational Flow of Sub Controller

Figure 10:
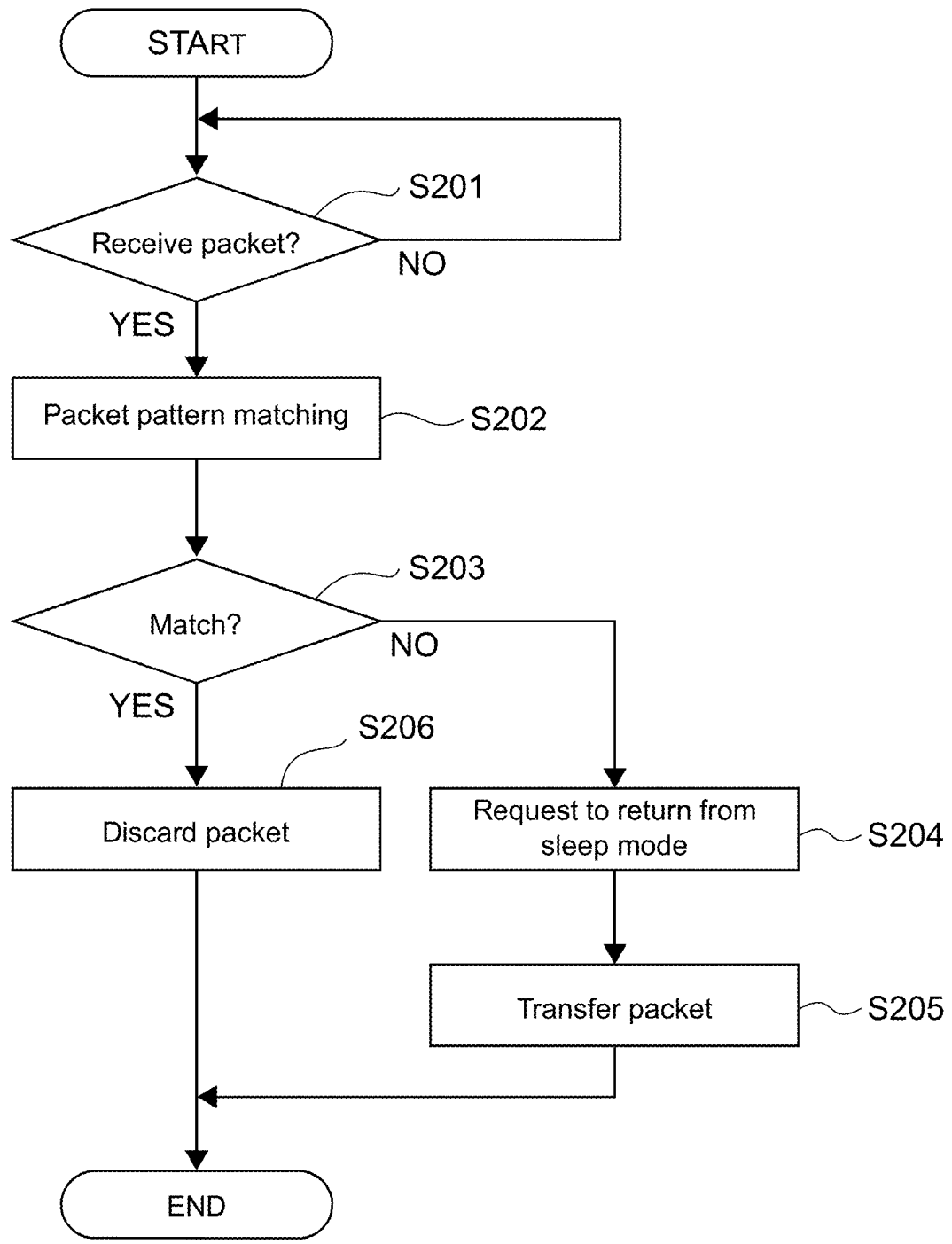
FIG. 10 shows an operational flow of the sub controller.

FIG. 10 shows an operational flow of the sub controller.

In the sleep mode, the sub processor 201 of the sub controller 200 receives a packet from an external device (not shown) via the communication interface 300 (Step S201, YES).

The sub processor 201 determines whether or not the packet pattern of the received packet matches with the TCP packet patterns (port-dependent TCP packet patterns or port-independent TCP packet patterns) and the port-dependent UDP packet patterns included in the packet pattern list 130 written in the sub RAM 203 (Step S202).

The sub processor 201 determines that the packet pattern of the received packet matches with one of the TCP packet patterns (port-dependent TCP packet patterns or port-independent TCP packet patterns) and the port-dependent UDP packet patterns included in the packet pattern list 130 written in the sub RAM 203 (Step S203, YES).

Then, the sub processor 201 requests the main processor 101 to return to the normal mode from the sleep mode (wake up) (Step S204). The sub processor 201 receives a notification from the main processor 101 that the main processor 101 has returned to the normal mode from the sleep mode, and then transfers the packet to the main processor 101 (Step S205).

Meanwhile, the sub processor 201 determines that the packet pattern of the received packet matches with no packet pattern included in the packet pattern list 130 written in the sub RAM 203 (Step S203, NO). Then, the sub processor 201 discards the received packet (Step S206).

5. Conclusion (1) According to the present embodiment, the main processor 101 of the main controller 100 determines that a total number of the port-dependent UDP packet patterns and the port-dependent TCP packet patterns exceeds a maximum value (Steps S118 and S123, YES), and then creates port-independent TCP packet patterns for different TCP protocols, respectively, the port-independent TCP packet pattern being one packet pattern specifying no TCP port (Steps S120-S121). The main processor 101 of the main controller 100 supplies the port-dependent UDP packet patterns and the port-independent TCP packet patterns to the sub processor 201 of the sub controller 200 (Step S102), and starts the sleep mode (Step S103). Where a packet received in the sleep mode matches with a port-dependent UDP packet pattern or matches with a port-independent TCP packet pattern (i.e., all TCP packets) (Step S203, YES), the sub processor 201 of the sub controller 200 requests the main processor 101 to return from the sleep mode (Step S204).

As a result, where the information processing apparatus 10 receives a TCP packet in the sleep mode, the information processing apparatus 10 returns from the sleep mode without fail. Since TCP/IP is unicast communication, in principle, the destination of TCP packets received by the information processing apparatus 10 is the information processing apparatus 10 itself. Therefore the information processing apparatus 10 has to process almost all the TCP packets. Therefore, even if the information processing apparatus 10 returns from the sleep mode without fail when the information processing apparatus 10 receives TCP packets, the information processing apparatus 10 rarely returns from the sleep mode unnecessarily (for example, where the information processing apparatus 10 receives a TCP packet for an unused TCP port). Meanwhile, since UDP/IP enables broadcast and multicast communication, the information processing apparatus 10 receives many UDP packets (for example, name resolution query, etc.) not for the information processing apparatus 10. Therefore, if the information processing apparatus 10 returns from the sleep mode without fail when the information processing apparatus 10 receives UDP packets in the sleep mode, then, the information processing apparatus 10 may return from the sleep mode very frequently even if it is not necessary to return from the sleep mode actually, or the information processing apparatus 10 may not start the sleep mode at all. To the contrary, according to the present embodiment, the total number of the packet patterns is reduced since the port-independent TCP packet patterns are created. As a result, the information processing apparatus 10 rarely returns from the sleep mode unnecessarily and, at the same time, the occupied volume of the sub RAM 203 is not increased.

According to a conceivable means for reducing the total number of packet patterns, for example, many packet patterns are created by using a list structure for a data structure of packet patterns. However, according to this method, it may take a long processing time for a low-spec sub controller 200 to execute matching processing with the packet patterns having the list structure. To the contrary, if a high-spec sub controller 200 executes the matching processing with the packet patterns having the list structure at a high speed, then the cost may be high or the energy saving effect may be low. To the contrary, according to the present embodiment, the information processing apparatus 10 creates port-independent TCP packet patterns for different TCP protocols, respectively, the port-independent TCP packet pattern being one packet pattern specifying no TCP port (Steps S120-S121). As a result, the total number of packet patterns may be reduced.

(2) According to the present embodiment, the main processor 101 of the main controller 100 determines that the total number of the port-dependent UDP packet patterns and the port-dependent TCP packet patterns fails to exceed a maximum value (Steps S118 and S123, NO), and then supplies the port-dependent UDP packet patterns and the port-dependent TCP packet patterns to the sub processor 201 of the sub controller 200 (Step S102), and starts the sleep mode (Step S103). As a result, since the port-dependent TCP packet patterns are supplied to the sub processor 201 of the sub controller 200, when the information processing apparatus 10 receives TCP packets, the information processing apparatus 10 never returns from the sleep mode unnecessarily (for example, where the information processing apparatus 10 receives a TCP packet for an unused TCP port). As a result, according to the present embodiment, the total number of port-dependent UDP packet patterns and port-dependent TCP packet patterns fails to exceed the maximum value reliably. As a result, the information processing apparatus 10 rarely returns from the sleep mode unnecessarily and, at the same time, the occupied volume of the sub RAM 203 is not increased.

(3) According to the present embodiment, the main processor 101 of the main controller 100 determines that a total number of the port-dependent UDP packet patterns and the port-independent TCP packet patterns (Step S124, NO) exceeds a maximum value (Step S123, NO), then supplies part of the port-dependent UDP packet patterns and all the port-independent TCP packet patterns (Step S127) to the sub processor 201 of the sub controller 200, a total number of the part of the port-dependent UDP packet patterns and all the port-independent TCP packet patterns being the maximum value (Step S102), and starts the sleep mode (Step S103). As a result, the information processing apparatus 10 returns from the sleep mode where the information processing apparatus 10 receives TCP packets and part of UDP packets in the sleep mode. As a result, the information processing apparatus 10 returns from the sleep mode unnecessarily, as less as possible, when the information processing apparatus 10 receives UDP packets in the sleep mode.

(4) According to the present embodiment, the main processor 101 of the main controller 100 creates one port-independent TCP packet pattern for TCP/IPv4 protocol, and one port-independent TCP packet pattern for TCP/IPv6 protocol (Step S120). As a result, since the port-independent TCP packet patterns are created, the total number of packet patterns is reduced. As a result, the information processing apparatus 10 rarely returns from the sleep mode unnecessarily and, at the same time, the occupied volume of the sub RAM 203 is not increased.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a sub controller;
a main controller configured to notify the sub controller that the main controller starts a sleep mode and returns from the sleep mode; and
a communication interface configured to communicate with an external device connected to a network,
the main controller being configured to
detect a trigger to start the sleep mode, then
create port-dependent TCP packet patterns and port-dependent UDP packet patterns, the port-dependent TCP packet patterns being packet patterns specifying all in-use TCP ports, the port-dependent UDP packet patterns being packet patterns specifying all in-use UDP ports,
determine that a total number of the port-dependent UDP packet patterns and the port-dependent TCP packet patterns exceeds a maximum value, then
delete all the port-dependent TCP packet patterns,
create port-independent TCP packet patterns for different TCP protocols, respectively, the port-independent TCP packet pattern being one packet pattern specifying no TCP port, and
supply the port-dependent UDP packet patterns and the port-independent TCP packet patterns to the sub controller, and start the sleep mode, the sub controller being configured to, in the sleep mode,
   determine whether or not a packet pattern of a packet received from the external device via the communication interface matches with one of the port-dependent UDP packet patterns and the port-independent TCP packet patterns,
   where the sub controller determines that the packet pattern matches with no packet pattern, discard the received packet, and
   where the sub controller determines that the packet pattern matches with one packet pattern, request the main controller to return from the sleep mode, and transfer the packet to the main controller.

2. The information processing apparatus according to claim 1, wherein
   the main controller is configured to
      determine that the total number of the port-dependent UDP packet patterns and the port-dependent TCP packet patterns fails to exceed a maximum value, and then
      supply the port-dependent UDP packet patterns and the port-dependent TCP packet patterns to the sub controller, and start the sleep mode, and
   the sub controller is configured to, in the sleep mode,
      determine whether or not the packet pattern of the received packet matches with one of the port-dependent UDP packet patterns and the port-dependent TCP packet patterns.

3. The information processing apparatus according to claim 1, wherein
   the main controller is configured to
      determine that a total number of the port-dependent UDP packet patterns and the port-independent TCP packet patterns exceeds a maximum value, then
      supply part of the port-dependent UDP packet patterns and all the port-independent TCP packet patterns to the sub controller, a total number of the part of the port-dependent UDP packet patterns and all the port-independent TCP packet patterns being the maximum value, and start the sleep mode.

4. The information processing apparatus according to claim 1, wherein
   the main controller is configured to
      create, as the port-independent TCP packet patterns for the different TCP protocols, respectively,
         one port-independent TCP packet pattern for TCP/IPv4 protocol, and
         one port-independent TCP packet pattern for TCP/IPv6 protocol.

5. A non-transitory computer readable recording medium that stores a packet pattern creation program executable by an information processing apparatus including
   a sub controller,
   a main controller configured to notify the sub controller that the main controller starts a sleep mode and returns from the sleep mode, and
   a communication interface configured to communicate with an external device connected to a network,
   the packet pattern creation program causing the main controller of the information processing apparatus to
      detect a trigger to start the sleep mode, then
      create port-dependent TCP packet patterns and port-dependent UDP packet patterns, the port-dependent TCP packet patterns being packet patterns specifying all in-use TCP ports, the port-dependent UDP packet patterns being packet patterns specifying all in-use UDP ports,
      determine that a total number of the port-dependent UDP packet patterns and the port-dependent TCP packet patterns exceeds a maximum value, then
      delete all the port-dependent TCP packet patterns,
      create port-independent TCP packet patterns for different TCP protocols, respectively, the port-independent TCP packet pattern being one packet pattern specifying no TCP port, and
      supply the port-dependent UDP packet patterns and the port-independent TCP packet patterns to the sub controller, and start the sleep mode.

\* \* \* \* \*